No. 628,072. Patented July 4, 1899.
M. F. CONNETT.
DESK RULER.
(Application filed Sept. 8, 1898.)
(No Model.)
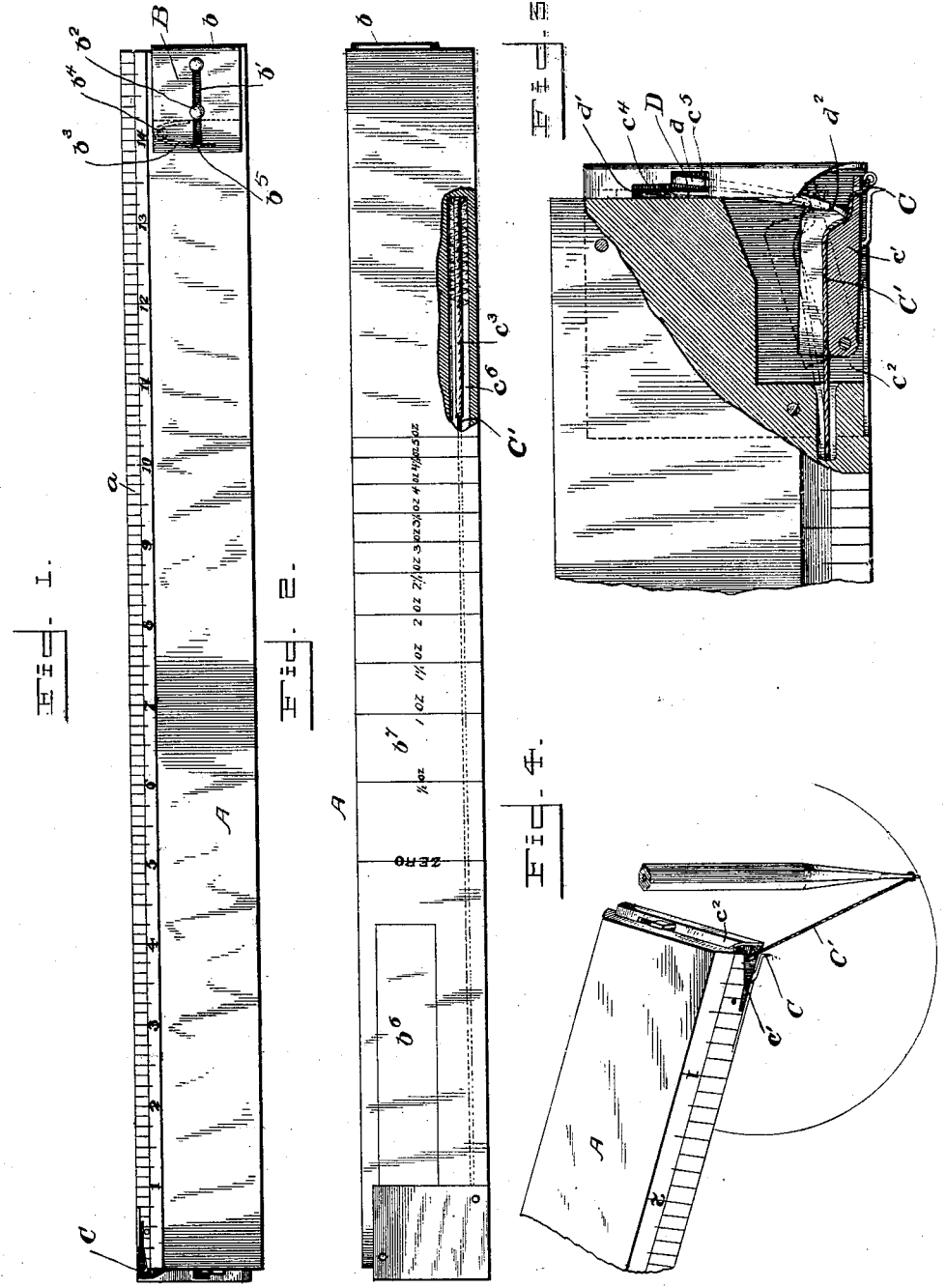
Witnesses:
Fenton S. Belt,
M. M. Watson.
Inventor:
Matthew F. Connett
By David H. Mead.
Attorney.

UNITED STATES PATENT OFFICE.

MATTHEW F. CONNETT, OF SAN ANTONIO, TEXAS, ASSIGNOR TO C. C. JANIN AND JOHN H. SCHIEBERT, OF SAME PLACE.

DESK-RULER.

SPECIFICATION forming part of Letters Patent No. 628,072, dated July 4, 1899.

Application filed September 8, 1898. Serial No. 690,465. (No model.)

*To all whom it may concern:*

Be it known that I, MATTHEW F. CONNETT, a citizen of the United States, residing at San Antonio, in the county of Bexar and State of Texas, have invented certain new and useful Improvements in Desk-Rules; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to desk-rulers.

The object of the invention is to provide an article of the class referred to which shall have all the essentials of and be adapted for the uses of an ordinary ruler and at the same time be so constructed and provided with such attachments as to enable a user to weigh small articles for the purpose, for instance, of determining the necessary postage for transmitting the articles through the mails.

Further, the object of the invention is to provide a desk-ruler having combined therewith attachments by the use of which, in conjunction with a pen or pencil, circles of any desired and predetermined diameter may accurately be drawn.

An embodiment of the invention showing the preferred construction is illustrated in the accompanying drawings, in which—

Figure 1 is a side view of a ruler. Fig. 2 is a view similar to what is shown in Fig. 1, showing the opposite side. Fig. 3 is an enlarged view of one end of the ruler, a part being broken away, showing by full lines the means for use in drawing circles ready for operation and by dotted lines the position assumed after use; and Fig. 4 is a perspective view showing the position of the cord in drawing a circle.

In the drawings, A represents a ruler which in general form corresponds to the usual form of these articles, being provided on one side with a beveled edge $a$, bearing the usual marks indicating inches and divisions thereof.

The ruler is provided at one end with a plate B, the main portion of which is arranged in a countersink on one side of the ruler and which has its end $b$ bent at right angles to the main portion, the right-angular portion being of a length corresponding to the thickness of the body of the ruler. The plate has a slot $b'$ in its main portion, receiving a headed pin $b^2$, by which the plate is retained in place on the ruler in such manner as to allow the plate to be moved longitudinally of the ruler to allow the portion $b$ to be moved toward or away from the end of the ruler. Arranged between the plate B and the ruler is a leaf-spring $b^3$, attached at one end to a pin $b^4$, set in the body of the ruler, and at the other end bearing against a projection $b^5$ on the inner face of the plate B, as shown by dotted lines in Fig. 1 of the drawings. A piece of metal $b^6$ is set into the face of the ruler at the end opposite to that at which the plate B is placed, and it is of proper weight to insure the accurate indication of the weight of an article when the latter is placed in proper position and the ruler used as hereinafter indicated. On the opposite side of the ruler to that on which the plate B is attached is a scale $b^7$, indicating ounces and fractions thereof.

In the use of the above-described portion of my invention the ruler is placed, with the beveled face downward, on a pencil or the like, and the end of the plate B which rests against the end of the ruler is moved out. The article to be weighed is placed between the end of the ruler and the end of the plate, where it will be held by the action of the spring $b^3$. After this the ruler is moved longitudinally on the pencil or the like until it balances, and the marks of ounces are so arranged that the mark in line with the article on which the ruler is placed will indicate the weight of the object attached to the end of the ruler. When the object weighed is removed, the plate B is returned to its normal position by the spring $b^3$.

At the end of the ruler opposite to that at which the plate B is arranged is the means, which will now be described, for use in drawing circles. This consists, essentially, of the pointed projection C and the cord C'. The projection is mounted on a small block $c'$, pivotally attached to a plate $c^2$, which covers an opening in the ruler, receiving the block. Adjacent to the pointed projection in the block $c'$ is an opening through which the cord $C'$ runs. The outer end of the cord has a ring attached thereto, and the other end of the cord extends from the block down into an opening $c^6$ in the ruler. Placed in this opening is a piece of rubber $c^3$, as shown in full lines, or a coiled spring, as shown in dotted lines. The end of the rubber or spring removed from the plate $c^2$ is fastened securely in the groove, and to the other end the cord $C'$ is attached.

The end of the plate $c^2$ which is bent at right angles to fit along parallel to the end of the ruler has cut in it a way $c^4$, having at one end thereof a depression $c^5$. A sliding plate D is arranged between the plate $c^2$ and the end of the ruler. This plate consists of the main portion, having a projection $d$, adapted to project into and move back and forth in the way $c^4$ and to enter the depression $c^5$, and the spring portion $d'$, bearing against the end of the ruler.

The block $c'$ has in it an indentation forming a guideway for the cord and also for the reduced end $d^2$ of the plate D.

In the normal positions of the parts the block $c'$, and consequently the pointed projection and the end of the cord, are by the tension of the rubber or spring moved inward to be inside the edge of the ruler.

When it is desired to use the circle-drawing attachment, the plate D is moved until its projection enters the depression in the way $c^4$. By this movement the block is moved on its pivot, causing the pointed projection to extend beyond the edge of the ruler and also bringing the ring on the end of the cord into a position to be grasped. After this the cord is drawn along the edge of the ruler until a distance corresponding to the radius of a circle to be drawn is reached on the scale. When the parts are in this position, the pointed projection is placed on the point which is to be the center of the circle to be drawn and a pen, pencil, or the like passed through the ring in the end of the cord. Keeping the cord extended, the pen or pencil is moved, and as a result a perfect circle is described. When the plate D is moved against the block $c'$, the cord is pressed against the block by the bent end of the plate in such way as to allow the cord to be withdrawn freely, and at the same time inward movement of the cord is prevented, the strain exercised by the rubber or spring exerting a strain to bind the cord against the block. After using the device the plate D is moved back from the block, releasing the cord, which will be drawn inward by the rubber or spring until the ring on the end of the cord comes in contact with the block, when the latter is moved inward, bringing the pointed projection and the ring inside the face of the ruler.

Having thus described my invention, what I claim as new, and desire to secure by Letters Patent, is—

1. A ruler having combined therewith a movable pointed projection, a cord provided at its end with a ring, elastic means for connecting the cord to the ruler, and means for locking the cord, substantially as described.

2. A ruler having combined therewith a pointed projection mounted on a movable block, a cord passing through an opening in the block, a movable plate having a projection adapted to press the cord against the block, and elastic means for attaching the cord to the ruler.

3. A ruler having combined therewith a pointed projection mounted on a movable block, a cord passing through an opening in the block, elastic means for connecting the cord to the ruler, and a sliding plate adapted to move the block outward and to engage the cord, substantially as described.

4. A ruler having combined therewith a pointed projection mounted on a movable block, a cord passing through an opening in the block, elastic means for connecting the cord to the ruler, a plate provided with a way having an indentation arranged adjacent to the block, and a sliding plate arranged in the way and having a projection entering the indentation and adapted to be brought into contact with the block to move it outward and to engage the cord, substantially as described.

In testimony whereof I affix my signature in presence of two witnesses.

MATTHEW F. CONNETT.

Witnesses:
F. F. YALE,
C. H. WAGNER.